United States Patent [19]
Kiriu

[11] Patent Number: 5,307,461
[45] Date of Patent: Apr. 26, 1994

[54] MULTIPLE RANK HIERARCHICAL DATA STORAGE SYSTEM WITH DATA COHERENCE

[75] Inventor: Yoshio Kiriu, Hadano, Japan

[73] Assignee: Hitachi, Ltd., Tokyo, Japan

[21] Appl. No.: 950,745

[22] Filed: Sep. 24, 1992

Related U.S. Application Data

[63] Continuation of Ser. No. 313,721, Feb. 21, 1989, abandoned.

[30] Foreign Application Priority Data

Feb. 22, 1988 [JP] Japan .................... 63-37437

[51] Int. Cl.$^5$ ............................. G06F 13/00
[52] U.S. Cl. .................... 395/250; 364/964.2; 364/243.4
[58] Field of Search ............. 364/DIG. I, DIG. II; 395/250, 800

[56] References Cited

U.S. PATENT DOCUMENTS

| | | | |
|---|---|---|---|
| 4,055,851 | 10/1977 | Jenkins | 395/425 |
| 4,075,686 | 2/1978 | Calle | 395/375 |
| 4,189,770 | 2/1980 | Gannon | 395/425 |
| 4,394,732 | 7/1983 | Swenson | 395/425 |
| 4,429,385 | 1/1984 | Cichelli | 370/92 |
| 4,442,487 | 4/1984 | Fletcher et al. | 395/425 |
| 4,476,524 | 10/1984 | Brown et al. | 395/325 |
| 4,499,539 | 2/1985 | Vosacek | 395/425 |
| 4,521,850 | 6/1985 | Wilhite et al. | 395/250 |
| 4,639,862 | 1/1987 | Wada et al. | 395/425 |
| 4,719,563 | 1/1988 | Kosingel et al. | 395/775 |
| 4,821,172 | 4/1989 | Kaneko | 395/375 |
| 4,905,188 | 2/1990 | Chuang et al. | 395/425 |

FOREIGN PATENT DOCUMENTS

| | | |
|---|---|---|
| 0214870 | 3/1983 | European Pat. Off. . |
| 0165823 | 12/1985 | European Pat. Off. . |
| 0173893 | 3/1986 | European Pat. Off. . |
| 57-57782 | 6/1977 | Japan . |

OTHER PUBLICATIONS

Akira Hattori, et al., "Three-Level Hierarchical Storage System for Facom M-380/382", Proceedings of the IFIP 9th World Computer Congress, Sep. 1983, pp. 693–697.

Primary Examiner—David Y. Eng
Attorney, Agent, or Firm—Fay, Sharpe, Beall, Fagan, Minnich & McKee

[57] ABSTRACT

An extended, hierarchical storage system includes a main storage, an extended storage, and a work storage having a speed and capacity intermediate therebetween, Additionally, a relatively small, high-speed buffer storage is provided as an adjunct to a processor. The work storage implements a store-in mode and incorporates a flag representative of validity of data therein, which, in turn, impacts upon whether an update to lower ranking memory is necessary upon removal of data stored therein.

35 Claims, 5 Drawing Sheets

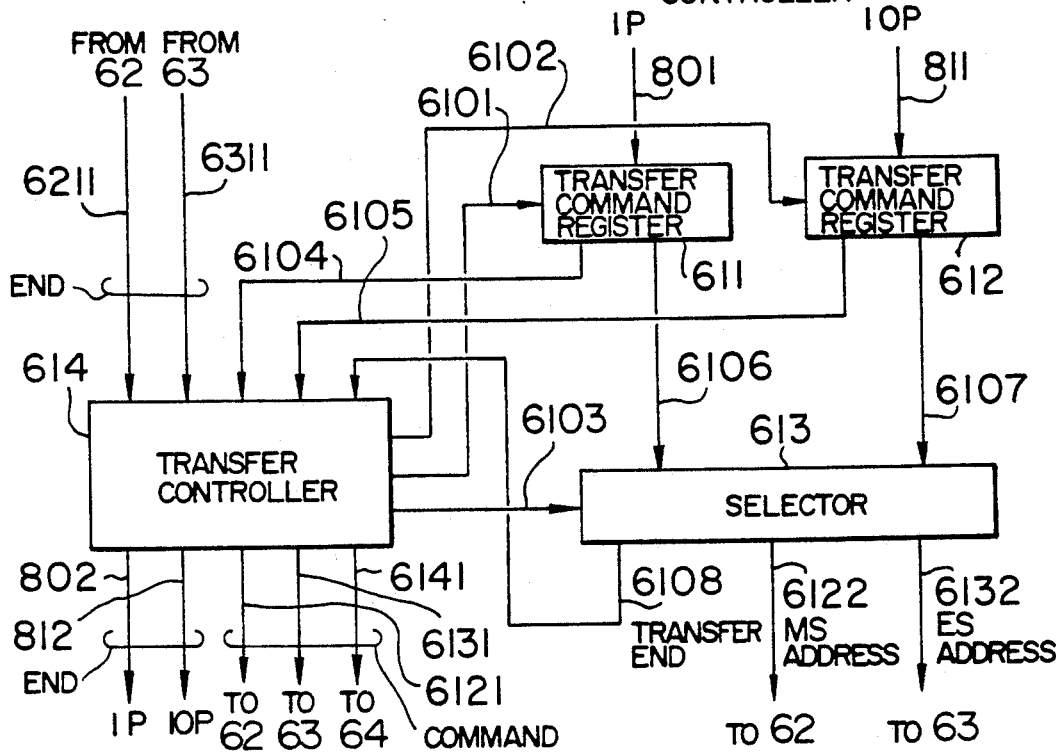
FIG. 3 TRANSFER COMMAND CONTROLLER
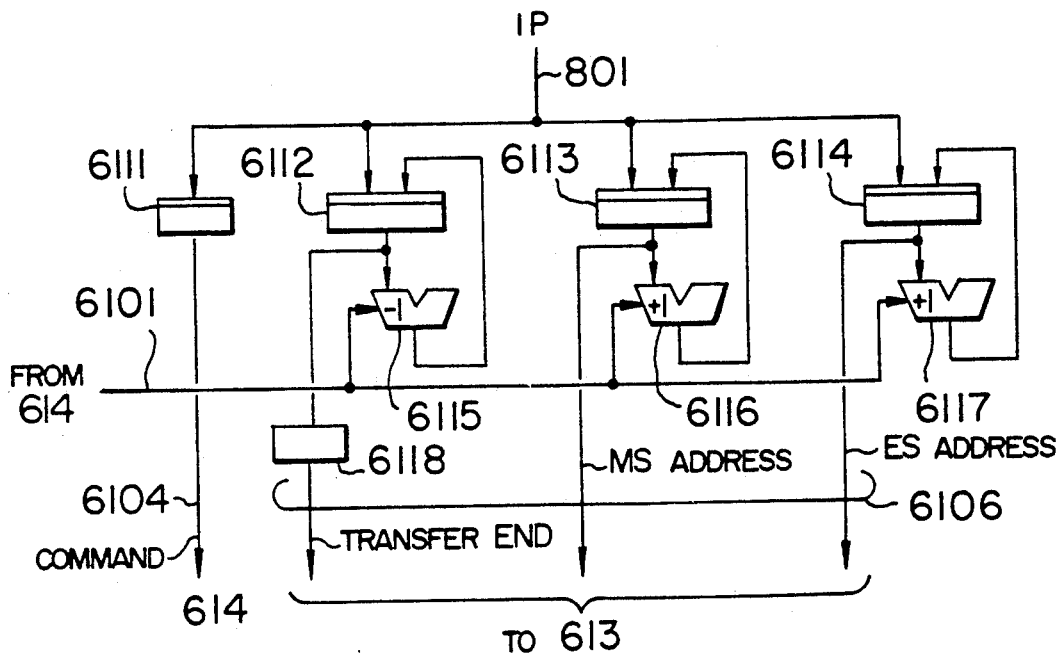
FIG. 4 TRANSFER COMMAND REGISTER

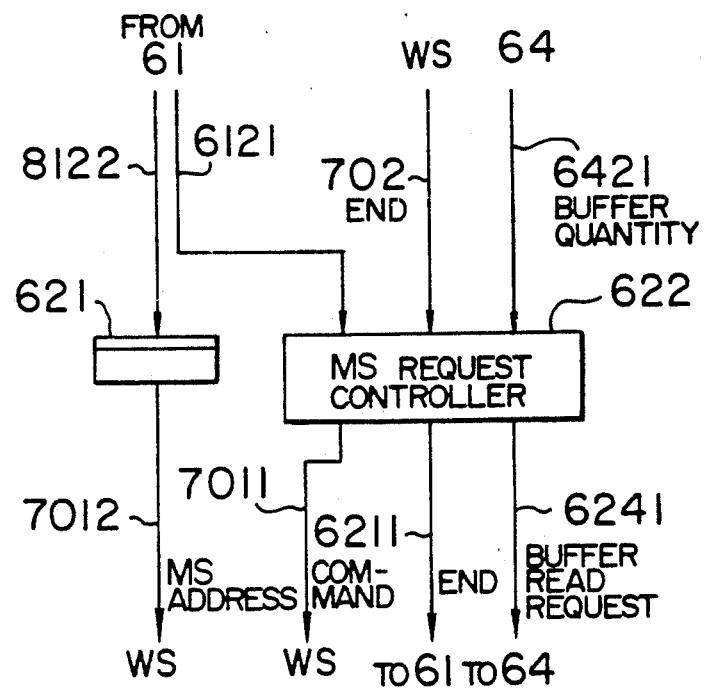
FIG. 5 REQUESTER 62
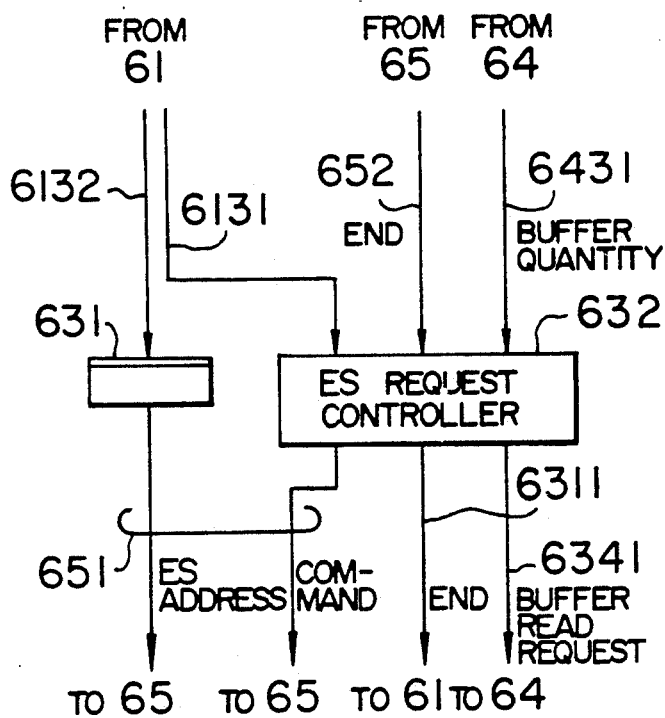
FIG. 6 REQUESTER 63

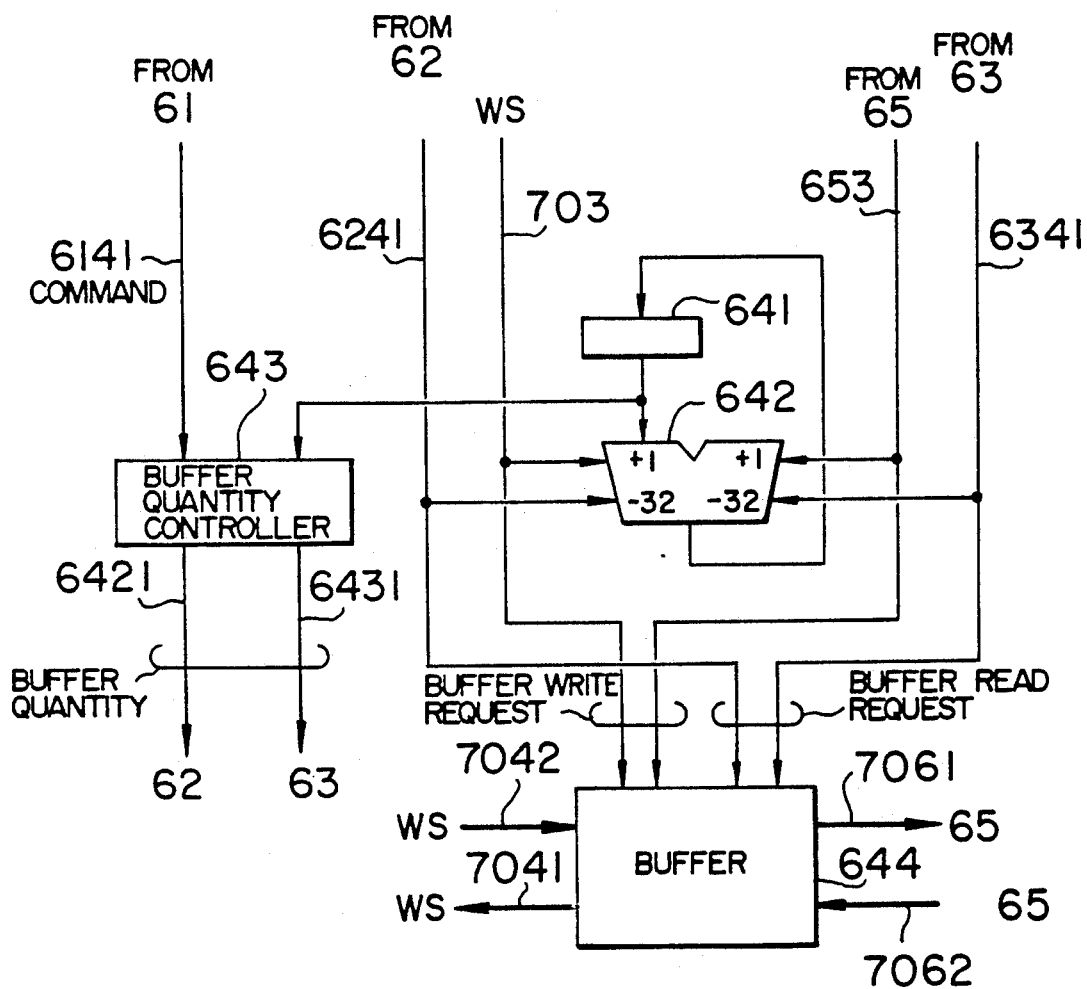
FIG. 7 DATA BUFFER

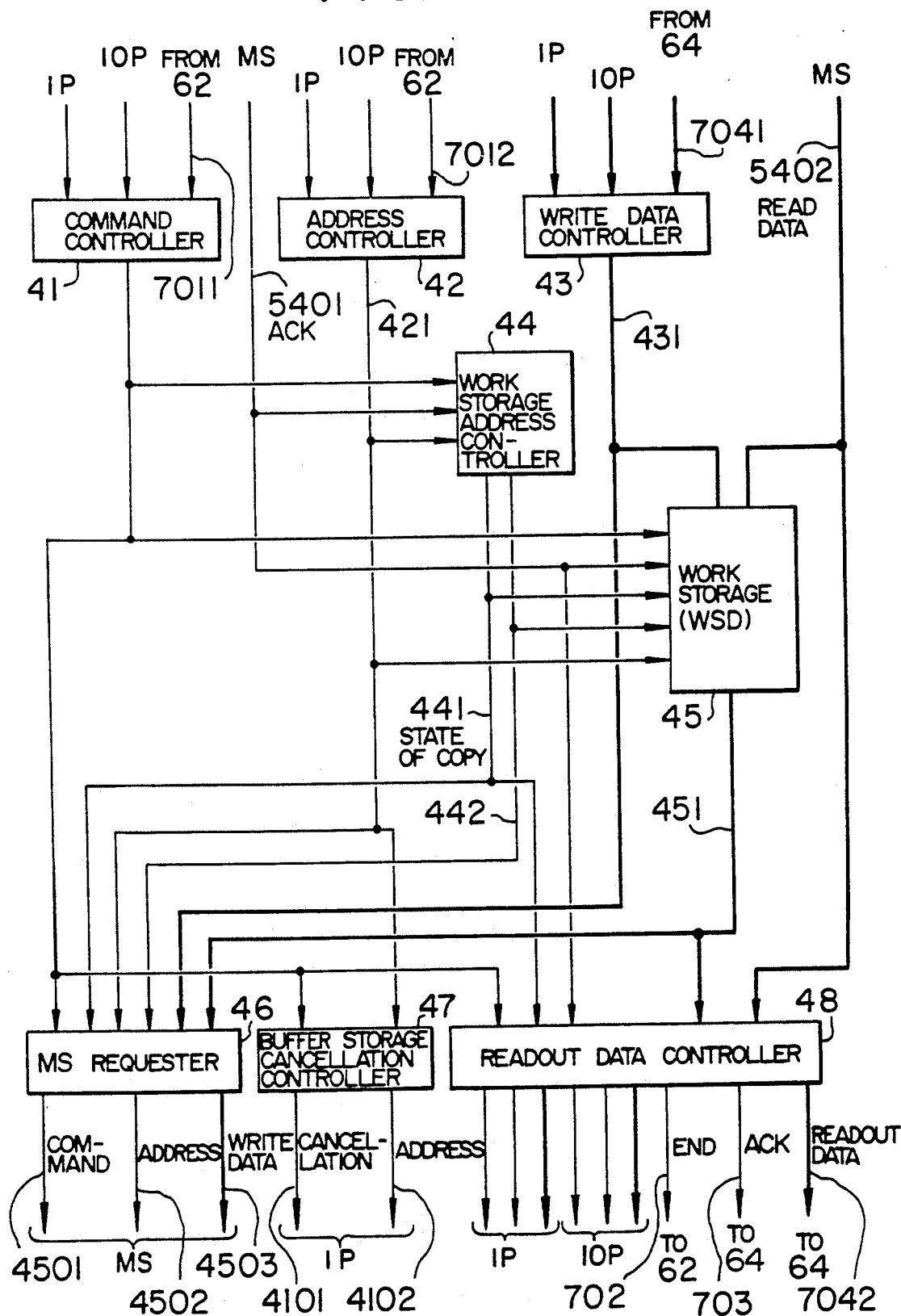
FIG. 8 WORK STORAGE

MULTIPLE RANK HIERARCHICAL DATA STORAGE SYSTEM WITH DATA COHERENCE

This is a continuation of copending application Ser. No. 07/313,721 filed on Feb. 21, 1989 now abandoned.

CROSS-REFERENCE TO OTHER PATENT APPLICATION

This invention pertains to U.S. Pat. No. 4,719,563 filed by H. Kosuge, et al on Dec. 20, 1984 and issued to them on Jan. 12, 1988.

BACKGROUND OF THE INVENTION

This invention relates to an extended storage system for a data processing system, and particularly to an extended storage system suited to transfer data between hierarchical storages and an extended storage.

U.S. Pat. No. 4,476,524 issued to D. T. Braun et al. on Oct. 9, 1984, discloses a data processing system which includes a data transfer path between a main storage (termed MS hereinafter) and an extended storage (or page storage, termed ES hereinafter) and performs data transfer between the MS and extended storage using the data transfer path.

An earlier system for improving the adjustment of a difference in the operating speed between a processor and MS in a data processing system may be found in Japanese Patent Application JP-A-52-71138 (corresponding to JP-B-57-57782). This document discloses hierarchical storages in which a small-capacity, high-speed high ranking storage, e.g., a buffer storage (termed BS hereinafter) is provided on the part of the processor, and an intermediate-rank storage, e.g., a work storage (termed WS hereinafter) serving as a second-rank buffer, having an intermediate speed and intermediate capacity as compared to the BS and MS is provided between the BS and MS. In this case, the MS is the lowest-rank storage.

U.S. Pat. No. 4,639,862, issued to H. Wada on Jan. 27, 1987, discloses an addressing system for extended storage. The contents of the above publication are introduced merely as a background to the present patent application.

In reading out data, such as an instructions or operand, stored in three or more hierarchical storages, the data is read out from a storage of as high rank as possible which holds the object data or contains a copy of the data. Only if any storage higher in rank than MS does not contain a copy of data, is it read out from the MS. Control is made to place frequently used data at a higher rank storage. The processing speed is thus enhanced.

In writing data into hierarchical storages, data in storages of all ranks are not rewritten at once, but instead, altered data is rewritten in a store-in manner for storages below a certain rank. The processing speed is thus enhanced.

Among control modes of rewriting data in a storage of a certain rank, rewriting data immediately, after rewriting data in the certain rank storage, to the next lower ranking storage is categorized to be "store-through" or "write-through" mode, while rewriting data by returning the data to the next lower ranking storage when the rewrited data in the active storage is no longer used is categorized to be "store-in" or "write-back" mode. In a hierarchical storage system which controls storing into an intermediate storage in store-in mode, the MS which is the lowest-rank storage does not necessarily have its data always updated to the newest state.

Recent advanced semiconductor technologies have provided higher operating speeds for processors, year after year, whereas MSs have achieved relatively little progress in the operating speed, although capacities have increased and their costs lowered. Therefore, the difference of speed between these devices is further increasing.

In the data processing system disclosed in the above-mentioned U.S. Pat. No. 4,476,524, central processors (CPs) and channel processors (CHs) are connected through a system controller (SC) to main storages (MSs), which are connected with page storages (PSs) through an MS/PS data bus.

SUMMARY OF THE INVENTION

An object of this invention is to provide an extended storage system used suitably for transferring data between hierarchical storages of three ranks or more and an extended storage.

Another object of this invention is to provide an extended storage system which ensures the latest version of copied data by merely having means which, following a data transfer from an extended storage to hierarchical storages, invalidates the copy of transfer destination data among data copied in a storage higher in rank than at least one intermediate-rank storage.

A further object of this invention is to prevent improper data transfer to the ES from the MS whose contents would not be yet updated to the latest version due to the presence of an intermediate-rank work storage which is controlled in store-in mode and is higher in rank than the MS.

A further object of this invention is to solve such a problem that, in a case wherein data transfer from the ES to MS and wherein a WS or BS higher in rank than the MS has a copy of data that has been stored in the MS until the transfer, the copied data in the WS or BS is inconsistent with the newly transferred data to the MS and the transferred data solely becomes new data.

According to this invention, the above objectives are achieved through the provision, between at least one intermediate-rank storage controlled in store-in mode and an ES, of a data transfer path for data transfer between the intermediate-rank storage and the ES. Further, means is provided for invalidating transfer destination data of the data to be transferred in the hierarchical storages, i.e., portion corresponding to the data to be cancelled because of change in destinated portion, among data copied in a storage higher in rank than the intermediate-rank storage. There can be achieved a data transfer from the ES to a hierarchical storage made similarly as the data transfer from a processor to the hierarchical storage.

Further provided is control means which, following a data transfer between the hierarchical storages and ES, invalidates or retards the transferred data in the intermediate-rank storage and storages excluding MS lower in rank than the intermediate-rank storage (intermediate/lower ranking storages). More specifically, if the WS has a copy of data to be cancelled which is already in the MS destination attributable to the transfer from ES to MS, it is cancelled. If the WS does not have a copy of data of MS destination to be cancelled, which case is not a normal store-in operation, an operation to copy the data into the WS is retarded, namely it is not made valid. The discrimination between "valid" and "invalid" is suitably made using flag means.

With a data transfer path being provided between the intermediate-rank storage or WS and ES, when data is transferred from the MS or WS among hierarchical storages to the ES, the intermediate-rank storage is first referenced. If the WS has a copy of the data to be transferred, the data is read out of the intermediate-rank storage and transferred to the ES. If the WS does not have the copy, the data is read out of the MS and transferred to the ES. Since storages higher in rank than the intermediate storage or BS are controlled in store-through mode, the transfer data read out as described above is always in the latest version among the WS and the BS.

With the control means for invalidating or retarding the copy of data to be transferred from the intermediate-storage being activated, if there is a copy of transfer data, each storage within the intermediate-rank storage which has been referenced reading the transfer data invalidates the copy after the data has been read out, or, if the copy is absent, retards the copy in the self storage of the data read out from a lower-rank storage.

In this way, with the control means being activated, when data transfer takes place between hierarchical storages and ES, the intermediate-rank storage can be placed in a state of having no copy of the transfer data, and accordingly for a data transfer of less urgency the control means is activated so that the intermediate storage can be used more efficiently. For an urgent data transfer between the ES and hierarchical storages, the transfer is accompanied by copying by holding the generation of the command which activates the control means.

BRIEF DESCRIPTION OF THE DRAWINGS

FIG. 3 is a block diagram showing the arrangement of the transfer command controller 61 in FIG. 2;

FIG. 4 is a block diagram showing the arrangement of the transfer command register 611 in FIG. 3;

FIG. 5 is a block diagram showing the arrangement of the requester 62 in FIG. 2;

FIG. 6 is a block diagram showing the arrangement of the requester 63 in FIG. 2;

FIG. 7 is a block diagram showing the arrangement of the data buffer 64 in FIG. 2; and FIG. 8 is a block diagram showing the arrangement of the WS 4 in FIG. 1.

DESCRIPTION OF THE PREFERRED EMBODIMENT

An embodiment of the inventive extended storage system will be described in detail with reference to the drawings.

Figure 1:
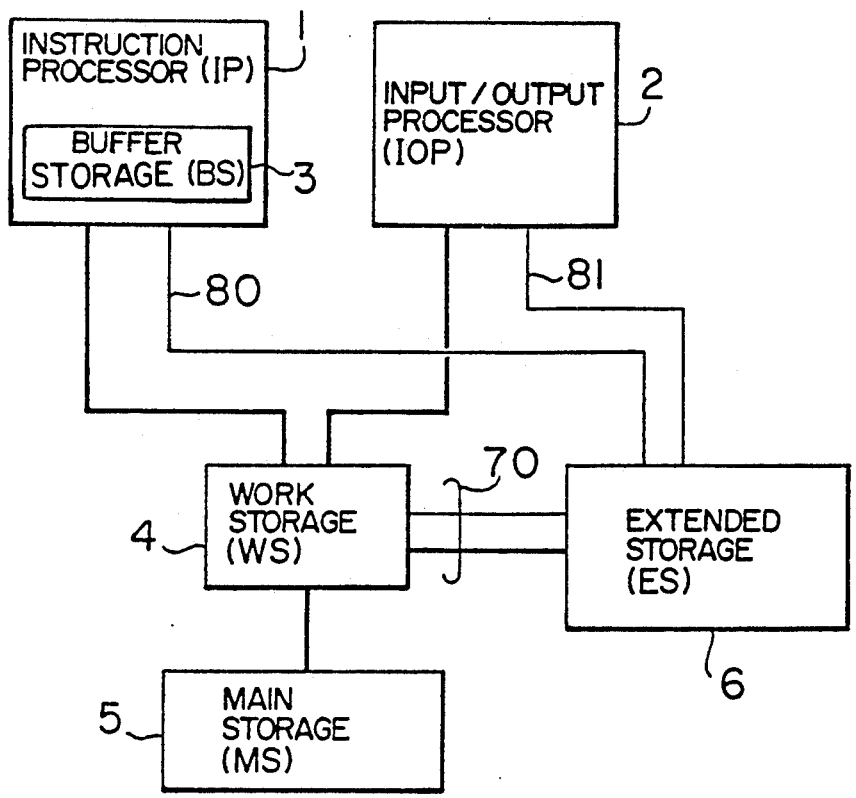
FIG. 1 is a block diagram of a data processing system provided with the extended storage system according to this invention.
Figure 2:
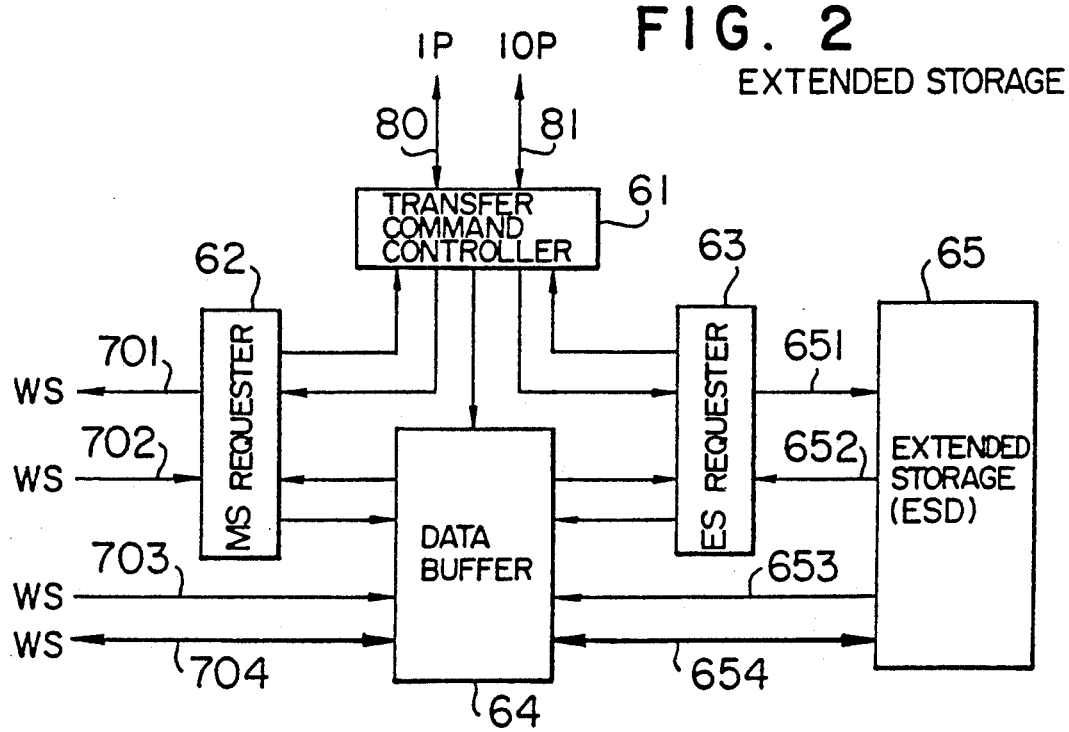
FIG. 2 is a block diagram showing the arrangement of the ES 6 in FIG. 1.

In FIG. 1, the inventive extended storage system comprises hierarchical storages including, from higher to lower ranks: a buffer storage (BS) 3; a work storage (WS) 4 and a main storage (MS) 5; and an extended storage (ES) 6, with a data transfer path 70 being provided between the WS 4 and ES 6. The BS 3 and WS 4 are controlled in store-through mode and store-in mode, respectively. An instruction processor (IP) 1 and input-/output processor (IOP) 2 dictate and control the data transfer between the WS 4 and ES 6 using an IP control signal line 80 and IOP control signal line 81, respectively.

The ES 6 comprises an extended storage device (termed ESD) 65 which stores data from the WS 4, a transfer controller 61 which controls the transfer commands from the IP 1 and IOP 2, requesters 62 and 63 which issue write requests and read requests to the WS 4 and ESD 65, and a data buffer 64 which temporarily holds data from the WS 4 and ESD 65.

The transfer controller 61 comprises, as shown in FIG. 3, transfer command registers 611 and 612 which hold and control the transfer commands from the IP 1 and IOP 2, a selector 613 which selects the output of the transfer command register 611 or 612, and a transfer controller 614 which generally controls data transfer.

The transfer command register 611 comprise, as shown in FIG. 4, a command register 6111, a transfer volume register 6112, an MS address register 6113, an ES address register 6114, a subtracter 6115, adders 6116 and 6117, and a transfer end tester 6118 which detects that the transfer volume register 6112 becomes "empty". The transfer command register 612 has the same arrangement as 611.

Commands of data transfer between WS 4 and ES 6 are sent to the ES 6 over the transfer command lines 801 and 811, respectively, depending on the operand of each command and the contents of a general purpose register specified by command for a command from the IP 1, or depending on the channel command word (CCW) for a command from the IOP 2. The command contains the transfer direction between the WS 4 and ES 6, the specification of activation for the control means of copy invalidation/retardation to the WS 4, the MS address and ES address indicative of the starting addresses of the transfer source and transfer destination.

Commands sent from the IP 1 are set in the respective registers 6111–6114 in the transfer command register 611, while commands sent from the IOP 2 are set in the respective registers in the transfer command register 612. A command set in the transfer command register 611 or 612 is delivered to the transfer controller 614 over command line 6104 or 6105. The transfer controller 614 selects one of the command sources based on the prescribed rule and operates on the selector 613 to distribute the transfer end signal 6108, MS address 6122 and ES address 6132 from the selected transfer command register to the respective blocks so that the transfer operation is executed in accordance with the contents of the selected transfer command register.

Initially, the transfer controller 614 tests the transfer end signal 6108 and, if it is "1" indicative of "zero transfer remainder", indicates the end of transfer to the originating processor over the line 802 or 812. If, on the other hand, the transfer end signal 6108 is "0", the controller 614 analyzes the selected command and activates the requesters 62 and 63 and data buffer 64 using the command lines 6121, 6131 and 6141. The command line 6121 carries such information as transfer direction and copy control, and command lines 6131 and 6141 carry information for specifying the transfer direction and the like. In response to the activation, the selector 613 delivers the MS address to the requester 62 over the line 6122 and the ES address to the requester 63 over the line 6132.

Following the activation of the requesters 62 and 63 and data buffer 64, the transfer controller 614 directs the transfer command register over the line 6101 or 6102 to increment the MS address and ES address and decrement the transfer remainder. For example, when the command from the IP 1 is selected, the transfer controller 614 instructs the transfer command register 611 over the line 6101. On receiving the instruction, the transfer command register 611 operates on the subtracter 6115 and adders 6116 and 6117 to decrement the contents of the transfer remainder register 6112 and increment the contents of the MS address register 6113 and ES address register 6114, each by one.

The requester 62 comprises, as shown in FIG. 5, an MS address register 621 and an MS request controller 622. Similarly, the requester 63 comprises, as shown in FIG. 6, an ES address register 631 and ES request controller 632. The requesters 62 and 63 execute the transfer of 256-byte data by being activated by the transfer controller 614. In response to the activation, the MS requester 62 sets in the register 621 the MS address sent from the selector 613, and operates on its MS request controller 622 to analyze the command from the transfer controller 614. Similarly, the ES requester 63 sets the ES address in the register 631, and operates on its ES request controller 632 to analyze the command.

The data buffer 64 comprises, as shown in FIG. 7, a buffer quantity register 641, an adder/subtracter 642, a buffer quantity controller 643 which controls the requesters 62 and 63 depending on the quantity of buffer, and a buffer 644 which temporarily holds transferred data. By being activated by the transfer command controller 61, the data buffer 64 recognizes the data transfer direction based on the command sent over the line 6141. The buffer quantity controller 643 controls the requesters 62 and 63 using the lines 6421 and 6431 so that the data transfer source prevents the overflow of buffer 644 when its contents reach a certain level and the data transfer destination holds the issuance of request until a certain amount of data is stacked in the buffer 644. The above-mentioned certain level of buffer is controlled depending on the data transfer direction.

The requester 62 responds to the activation by the transfer controller 614 to send immediately, in case of the data transfer source being MS (accordingly, the destination is ES), the command from the MS request controller 622 together with the MS address in the register 621 to the WS 4 over the line 7011, and issues a read request. The requester 63 holds the issuance of request to the ESD 65 until it is informed by the buffer 64 over the line 6431 that a specified amount of data is stacked in the buffer 644. The data buffer 64, when readout data is sent from the WS 4 over the line 7042 in response to the read request, writes the readout data in the buffer 644, with an acknowledgement sent over the line 703 in synchronism with the data being a buffer write request. At this time, the adder/subtracter 642 increments the buffer quantity register 641 by one. The buffer quantity controller 643 examines the contents of the updated buffer quantity register 641 to judge whether the specified amount of data is stacked in the buffer 644. The buffer 64 repeats the above operations at each reception of readout data.

When the specified amount of data has been stacked in the buffer 644, the buffer quantity controller 643 indicates it to the requester 63 over the line 6431. In response to this signal, the requester 63 issues a buffer read request to the buffer over the line 6431, sends the command from the ES request controller 632 together with the ES address in the register 631 to the ESD 65, and issues a write request. At this time, the buffer 64 responds to the buffer read request of the requester 63 to read out the transfer data from the buffer 644 and sends it as write data to the ESD 65 over the line 7061. At the same time, the adder/subtracter 642 subtracts by 32 the contents of buffer quantity register 641. The subtrahend "32" is determined on the basis that the write request to the buffer 644 is 8-byte units, whereas the read request is 256-byte units, i.e., 32 fold.

In case of the data transfer source being ES (accordingly, the destination is MS), the requester 63 responds to the activation by the transfer controller 614 to send immediately the ES address and command to the ESD 65, and issues a read request. The requester 62 holds the issuance of request to the WS 4 until it is informed by the buffer 64 over the line 6421 that a specified amount of data is stacked in the buffer 644. The data buffer 64, when readout data is sent from the ESD 65 over the line 7062 in response to the read request, writes the readout data in the buffer 644, with an acknowledgement sent over the line 653 in synchronism with the data being a buffer write request. The buffer quantity register 641 has its contents incremented by one, and the buffer quantity controller 643 examines whether the specified amount of data is stacked in the buffer 644.

When the specified amount of data has been stacked in the buffer 644, the buffer quantity controller 643 indicates it to the requester 62 over the line 6421. In response to this signal, the requester 62 issues a buffer read request to the buffer over the line 6241, sends the MS address and command to the WS 4, and issues a write request. At this time, the buffer 64 responds to the buffer read request of the requester 62 to read out the transfer data from the buffer 644 and sends it as write data to the WS 4 over the line 7041. At the same time, the adder/subtracter 642 subtracts by 32 the contents of buffer quantity register 641.

In response to the delivery of the termination of requests from the WS 4 and ESD 65 to the requesters 62 and 64 over the lines 702 and 652, respectively, the requesters 62 and 63 indicate the end of data transfers, which have been initiated by the transfer controller 614, to the transfer controller 614 over the lines 6211 and 6311. Receiving the termination signals from both requesters 62 and 63, the transfer controller 614 tests the transfer end on the line 6108 from the selector 613, and, if it is "1" indicative of zero transfer remainder, indicates it to the originating processor over the line 802 or 812. If the line 6108 is "0", the transfer controller 614 activates the requesters 62 and 63 and buffer 64 to execute the data transfer by following the foregoing procedure.

Next, the operation of the WS 4 upon receiving a request from the requester 62 will be described. The WS 4 comprises, as shown in FIG. 8, a command controller 41, an address controller 42, a write data controller 43, a work storage address controller 44, a work storage device 45 (will be termed WSD), an MS requester 46, a buffer memory cancellation controller 47, and a readout data controller 48. The WS 4 has a pair of data transfer paths for IP 1 and IOP 2, as in the conventional system, which is added by the third data transfer path for the ES 6, so that it can deal with requests from ES 6 as well as those from the IP 1 and IOP 2.

When the ES 6 issues a request to the WS 4, the WS 4 shown in FIG. 8 sets the command and MS address sent from the requester 62 over the lines 7011 and 7012 in the command controller 41 and address controller 42, respectively. For a write request, write data from the data buffer 64 is further entered to the data controller 43 over the line 7041. The command from the ES 6 entered in the command controller 41 is added to commands from the IP 1 and IOP 2 for selection based on the prescribed rule. If the command from the ES 6 is selected, the WS 4 processes the request from the ES 6 in accordance with this command, the MS address from the requester 62 entered in the address controller 42 and write data from the data buffer 64 entered in the write data controller 43 at the time of write request. The WS 4 is assumed to make a copy of MS in a 256-byte unit and generate a request to the MS 5 in a 256-byte unit.

The WS 4, in case of the request from ES 6 being a read request, first enters the MS address 421 in the work address controller 44 to examine whether it has a copy of data of the MS address. If the data is found copied, the work storage address controller 44 reads out the data from the WSD 45 over the line 441. At this time, the address of the WSD 45 is part of the MS address 421 and on the line 442 for the rest. The data 451 read out of the WSD 45 is sent, together with the acknowledgement from the readout data controller 48 onto the line 703, to the data buffer 64 over the line 7042. In case the line 411 indicates that the invalidation or retardation of copy of the data is specified by the command, the work storage address controller 44, after the above-mentioned examination of copy, resets the copy valid bit to "0".

The work storage address controller 44, if data of the MS address is not copied, operates on the MS requester 46 over the line 441 to issue a read request to the MS 5. In this case, the MS address 421 is used. The MS requester 46 sends the command and MS address to the MS 5 over the lines 4501 and 4502, and issues a read request. The MS 5 responds to the read request to send back readout data and acknowledgement in synchronism with the data. Then, the work storage address controller 44 makes a new copy of the data as data of the MS address, and the readout data controller 48 sends the data to the data buffer 64 over the line 7042, while at the same time making acknowledgement to the line 703. At this stage of copying, the work storage address controller 44 gets a new storage location in the WSD 45 in accordance with the widely-known LRU (Least Recently Used) algorithm, and writes the readout data 5402 on the line 441 into the WSD 45. The address of WSD 45 indicative of the newly established storage location is given as part of the MS address 421 and on the line 442 for the rest. However, in case the line 411 indicates that the invalidation or retardation of the copy of the data is specified by the command, the work storage address controller 44 does not make the copy, and accordingly does not execute the writing to the WSD 45.

Next, the operation of the WS 4, in case of the request from the ES 6 being a write request, will be described. Initially, the WS 4 enters the MS address 421 to the work storage address controller 44 to examine whether data of the MS address is copied. If the data is copied, the work storage address controller 44 writes write data 431 into the WSD 45 over the line 441. Also in this case, the address of the WSD 45 is given as part of the MS address 421 and the line 442. If the line 411 indicates that the invalidation or retardation of the copy of the data is specified by the command, the work storage address controller 44 resets the copy valid bit to "0", and operates on the MS requester 46 over the line 441 to issue a write request to the MS 5, instead of writing the write data 431 into the WSD 45. In this operation, the MS address 421 and write data 431 are used. The MS requester 46 sends the command, MS address and write data to the MS 5 over the lines 4501, 4502 and 4503, and issues a write request.

If data of the MS address is not copied, the work storage address controller 44 makes a new copy of the write data 431 as data of the MS address, and writes the data 431 over the line 441 into a storage location established newly in the WSD 45 in the same manner as the previous case. In this operation, the address of WSD 45 indicative of the new storage location is given as part of the MS address and line 442 for the rest. However, in case the line 411 indicates that the invalidation or retardation of the copy of the data is specified by the command, the work storage address controller 44 does not make the copy, and operates on the MS requester 46 over the line 441 to issue a write request to the MS 5, as in the previous case, instead of writing the write data 431 into the WSD 45.

In case of the request from the ES 6 being a write request, the WS 4 further examines with the buffer memory cancellation controller 47 the state of copy of data of the MS address to the BS 3 in parallel to the copy examination for the data to the WS 4 by the work storage address controller 44. The buffer memory cancellation controller 47 is provided in advance with a front buffer address array (FAA) which stores the copy state of BS 3. In this case, the MS address 421 is entered to the controller 47 to examine whether data of the MS address is copied in the BS 3. If the data is found copied, the buffer memory cancellation controller 47 requests to the IP 1 over the line 4101 the cancellation of copy of the MS address indicated on the line 4102, thereby preventing the data written in the WSD 45 or MS 5 from becoming much newer than the data copied in the BS 3.

Although in the foregoing embodiment of this invention, the hierarchical storage system is organized in three ranks of BS 3, WS 4 and MS 5, the invention is also applicable to the system which further includes a storage of another rank controlled in store-in mode located between the WS 4 and MS 5, or a storage controlled in store-through mode located between the BS 3 and WS 4.

I claim:

1. An extended storage system employing hierarchical data storage areas comprising:
   (a) an instruction processor;
   (b) a main storage;
   (c) a buffer storage connected to said instruction processor for holding parts of contents of said main storage and has a function of being accessed faster than said main storage;
   (d) at least one work storage which is connected between said main storage and said buffer storage and has a function of being accessed at an intermediate access speed between access speeds of said main storage and buffer storage, said work storage being controlled in store-in mode for said main storage;
   (e) an extended storage which is connected to said work storage through a transfer path and has a storage capacity for supplementing the storage capacity of said main storage, said extended storage having an address space which is different from the address space of said main storage, and the extended storage having a larger capacity and being slower than the main storage:

(f) the instruction processor issuing data transfer request which includes main storage address and extended storage address;

(g) means coupled to the work storage and responsive to data transfer request issued from the instruction processor for detecting whether the work storage stores data designated by requested main storage address;

(h) means coupled to the work storage and responsive to the detection for transmitting, via the path, data read out from the work storage to the extended storage; and (i) means coupled to the extended storage and responsive to requested extended storage address for writing data transferred via the path in an area of the extended storage specified by the requested extended storage address.

2. An extended storage system employing hierarchical data storage areas according to claim 1 further comprising:

valid flag means which is provided for said work storage and adapted to indicate invalidity of part of the contents of said main storage held in said work storage; and a command controller responsive to a transfer command for said extended storage issued by said instruction processor for providing said flag means with a signal indicative of the invalidity of data in said work storage related to data to be transferred, in accordance with a transfer command for said extended storage issued by said instruction processor.

3. An extended storage system according to claim 2 further comprising:

a buffer storage cancellation controller connected to said command controller and responsive to the invalidity for providing a signal of the cancellation of part of data in said buffer storage; and a buffer address array which is provided in said buffer storage and used to control the validity of a copy, from said main storage, of data corresponding to part of address in said buffer storage, on the basis of the output of said buffer storage cancellation controller provided in said buffer storage.

4. An extended storage system according to claim 2, wherein said extended storage comprises:

means of holding the number of words of data transferred to/from said work storage over said transfer path, the starting address of said extended storage, the starting address of said main storage and said transfer command; and means of updating said starting addresses and said number of words at a transfer to/from said extended storage.

5. An extended storage system for data processing system which comprises an instruction processor and hierarchical storage of at least three ranks with a main storage, and an intermediate-rank storage among said hierarchical storages being controlled for storing in store-in mode, wherein said extended storage system comprises:

an extended storage having a different address space than said main storage and having a larger capacity and being slower than said main storage;

a data transfer path provided between said intermediate-rank storage and said extended storage for implementing a store-in mode data transfer between said hierarchical storages and said extended storage in accordance with a command from at least one of said instruction processor and an input/output processor;

said at least one of said instruction processor and said input/output processor issuing the command which includes low-rank storage address and extended storage address;

means coupled to said intermediate-rank storage and responsive to said command issued from said at least one of said instruction processor and said input/output processor for detecting whether said intermediate-rank storage stores data designated by requested low-rank storage address;

means coupled to said intermediate-rank storage and responsive to the detection for transmitting via the path data read out from said intermediate-rank storage to said extended storage; and means coupled to said extended storage and responsive to requested extended storage address for writing data transferred via the path in an area of said extended storage specified by said requested extended storage address.

6. An extended storage system according to claim 5, wherein said data transfer path includes means for transferring data from said extended storage to said hierarchical storages, such that a copy of data corresponding to the transfer destination of said data to be transferred among data copied in a storage higher in rank than said intermediate-rank storage is invalidated.

7. An extended storage system according to claim 5, wherein said data transfer path includes means for transferring data between said hierarchical storages and said extended storage, such that copies of said data to be transferred in said intermediate-rank storage are at least one of invalidated and retarded.

8. A data processing system employing hierarchical data storage areas having an instruction processor, a main storage, and a buffer storage for storing a part of contents of the main storage to supply the instruction processor with data stored therein, wherein the buffer storage has less storage capacity than the main storage but faster access to each location than the main storage comprising:

an extended storage having a different and independent address space from the main storage, wherein the extended storage has larger storage capacity than the main storage but slower access to each location than the main storage;

a first data path disposed in data communication between the main storage and the extended storage for transmitting data;

a second data path adapted for data communication between the buffer storage and the extended storage;

the instruction processor issuing a data transfer request which instructs a store-in mode data transfer between a certain memory storage address and a certain extended storage address;

detecting means, responsive to the request, for detecting whether the buffer storage contains a storage area designated by the certain main storage address;

means for activating data transfer via the data path between the area detected by the detecting means and a storage area of the extended storage designated by the certain extended storage address.

9. A data processing system according to claim 8 comprising the buffer storage being controlled in store-in mode for the main storage.

10. A data processing system according to claim 8 comprising another buffer storage disposed between the instruction processor and the first mentioned buffer storage, the another buffer storage having less storage capacity than the first mentioned buffer storage but faster access to each location than the first mentioned buffer storage.

11. A data processing system employing hierarchical data storage areas having an instruction processor, a main storage and a work storage which is connected to the main storage and has function of being accessed at higher access speed than that of the main storage, the system comprising:

an extended storage which is connected to the work storage through a transfer path and has a larger storage capacity than the main storage for supplementing the storage capacity of the main storage, said extended storage having an address space which is different from the address space of the main storage and said extended storage being slower than the main storage;

the instruction processor issuing data transfer request for a store-in mode data transfer, which data transfer request includes a certain main storage address and a certain extended storage address;

means coupled to the instruction processor and responsive to the data transfer request for detecting whether the work storage stores data designated by the certain main storage address;

means coupled to the work storage and responsive to detecting result for transferring via the data path data read out from the work storage to the extended storage; and means coupled to the extended storage and responsive to the request for writing data transferred via the data path in an area of the extended storage specified by the certain extended storage address.

12. A data processing system according to claim 11 comprising means for selectively invalidating data in the work storage which has already transferred to the extended storage by the means for transferring, and means responsive to the second mode for retaining data in the work storage which has already transferred to the extended storage by the means for transferring.

13. A data processing system according to claim 11 comprising means for reading out data which is stored in an area of the main storage designated by the certain main storage address when the detecting means fails to detect, wherein the means for writing writes data from the reading means to the extended storage.

14. A data processing system according to claim 13 comprising:

means for selectively bypassing data from the means for reading and sending to the means for writing; and means for selectively writing the sent data in the work storage while sending the data to the extended storage.

15. A data processing system employing hierarchical data storage areas having an instruction processor, a main storage, and a buffer storage for storing a part of contents of the main storage to supply the instruction processor with data stored therein, wherein the buffer storage has less storage capacity than the main storage but faster access to each location than the main storage comprising:

an extended storage having a different and independent address space from the main storage, wherein the extended storage has larger storage capacity than the main storage but slower access to each location than the main storage;

a first data path disposed in data communication between the main storage and the extended storage for transmitting data;

a second data path adapted for data communication between the buffer storage and the extended storage;

the instruction processor including means for issuing a data transfer request which instructs a store-in mode data transfer from a specified extended storage address to a specified memory storage address;

detecting means, responsive to the data transfer request, for detecting whether the buffer storage contains a storage area designated by the specified main storage address, including means for generating a success signal representative of a detection that the buffer storage contains the designated storage area;

means responsive to success signal for activating data transfer via the data path from a storage area of the extended storage designated by the specified extended storage address to the area detected by the detecting means; and means responsive to failure of the detection for activating data transfer via the data path from a storage area of the extended storage designated by the specified extended storage address to a storage area designated by the specified main storage address.

16. A data processing system according to claim 15 comprising means for indicating mode of invalidating, means responsive to the mode for invalidating data in the area detected by the detecting means and means for transferring data from the storage area of the extended storage designated by the specified extended storage address to the storage area designated by the specified main storage address instead of activating data transfer from a storage area of the extended storage designated by the specified extended storage address to the area detected by the detecting means.

17. A data processing system employing hierarchical data storage areas having an instruction processor, a main storage and a high rank storage disposed with a higher rank than the main storage for holding copy of a part of main storage data and for providing the copy data to the instruction processor, said high rank storage being accessed at higher speed than that of the main storage, the data processing system comprising:

an extended storage having independent addresses different from that of the main storage and transferring data to/from the main storage in accordance with a data transfer command generated by the instruction processor which specifies a store-in mode data transfer between a specified main storage address and a specified extended storage address, wherein the specified main storage address and the specified extended storage address are also defined by the data transfer command and said extended storage having a larger capacity and being slower than the main storage, a data path adapted for data communication between the high rank storage and the extended storage; and a first detection means for detecting a storage area in the high rank storage where data designated by the specified main storage address is held in accordance with the data transfer command from the instruction processor.

18. A data processing system according to claim 17, comprising the data transfer path disposed in the data communication between the high rank storage and the extended storage and means for performing data transfer through the data transfer path between an area of the high rank storage detected by the first detection means and the specified extended storage address.

19. A data processing system according to claim 17, comprising an input/output processor for generating signal which directs data transfer between a particular main storage address and a particular extended storage address, wherein the particular main storage address and the particular extended storage address are also defined by the signal, a second detection means for detecting a storage area in the high rank storage where data designated by the particular main storage address is held upon receiving the signal from the input/output processor.

20. A data processing system according to claim 18, comprising an input/output processor for generating signal which directs executing an input/output instruction which specifies data transfer between a particular main storage address and a particular extended storage address, wherein the particular main storage address and the particular extended storage address are also defined by the signal from the input/output instruction, a second detection means for detecting a storage area in the high rank storage where data designated by the particular main storage address is held upon receiving the signal.

21. A data processing system according to claim 20, comprising means for performing data transfer through the data transfer path between an area of the high rank storage detected by the second detection means and the specified extended storage address.

22. A data processing system according to claim 17, wherein the high rank storage is a work storage being controlled in store-in mode for the main storage.

23. A data processing system according to claim 17, comprising a buffer storage disposed between the high rank storage and the instruction processor, said buffer storage being accessed at higher speed than that of the high rank storage.

24. A data processing system according to claim 18, wherein the high rank storage is a work storage being controlled in store-in mode for the main storage.

25. A data processing system according to claim 18, comprising a buffer storage disposed between the high rank storage and the instruction processor, said buffer storage being accessed at higher speed than that of the high rank storage.

26. A data processing system according to claim 19, wherein the high rank storage is a work storage being controlled in store-in mode for the main storage.

27. A data processing system according to claim 19, comprising a buffer storage disposed between the high rank storage and the instruction processor, said buffer storage being accessed at higher speed than that of the high rank storage.

28. A data processing system according to claim 20, wherein the high rank storage is a work storage being controlled in store-in mode for the main storage.

29. A data processing system according to claim 20, comprising a buffer storage disposed between the high rank storage and the instruction processor, said buffer storage being accessed at higher speed than that of the high rank storage.

30. A data processing system according to claim 21, wherein the high rank storage is a work storage being controlled in store-in mode for the main storage.

31. A data processing system according to claim 21, comprising a buffer storage disposed between the high rank storage and the instruction processor, said buffer storage being accessed at higher speed than that of the high rank storage.

32. A data processing system employing hierarchical data storage areas having an instruction processor, and a main storage, comprising:
   a first buffer storage placed for data communication between the data processing system instruction processor and the main storage for storing therein a part of contents of the main storage to supply the instruction processor with data stored therein, wherein the first buffer storage has less storage capacity than the main storage but faster access to each location than the main storage and is controlled in store-through mode,
   a second buffer storage placed for data communication between the first buffer storage and the main storage for storing a part of contents of the main storage to supply the first buffer storage with data stored therein, wherein the second buffer storage has intermediate storage capacity and access speed between these of the main storage and first buffer storage and is controlled in store-in mode, and
   an extended storage having a data path capable of communicating data between the second buffer storage and the extended storage, wherein the extended storage has larger storage capacity than the main storage but slower access to each location than the main storage and has a different and independent address spaces from the main storage.

33. A data processing system according to claim 32, wherein when data of said main storage or said second storage is required to transfer to said extended storage, said second storage is first referenced and, if said second storage does not hold the required data, said main storage is referenced to transfer the data to said extended storage.

34. A data processing system having an instruction processor and a main storage comprising:
   a main storage and a high rank memory disposed higher rank than the main storage for holding copy of a part of main storage data and for providing the copy data to the instruction processor, said high rank memory being accessed at higher speed than that of the main storage and controlled in store-though mode,
   an intermediate rank memory disposed between the main storage and the high rank memory for holding copy of a part of main storage data and for providing the copy data to the high rank memory, said intermediate rank memory being accessed at intermediate speed between that of the main storage and the high rank memory and controlled in store-in mode, and
   an extended storage having independent address spaces different from that of the main storage and a data path for transferring data to/from the intermediate rank memory, wherein the extended storage has larger storage capacity than the main storage but slower access to each location than the main storage.

35. A data processing system according to claim 34, wherein when data of said main storage or a second storage is required to transfer to said extended storage, said second storage is first referenced and, if said second storage does not hold the required data, said main storage is referenced to transfer the data to said extended storage.

* * * * *

UNITED STATES PATENT AND TRADEMARK OFFICE
CERTIFICATE OF CORRECTION

PATENT NO. : 5,307,461
DATED : April 26, 1994
INVENTOR(S) : Yoshio Kiriu

It is certified that error appears in the above-indentified patent and that said Letters Patent is hereby corrected as shown below:

Claim 18, column 13, line 7, delete the first occurrence of "the" and substitute therefor --a--.

Claim 32, column 14, line 32, delete "these" and substitute therefor --those--; and,
line 39, delete "a".

Claim 34, column 14, lines 55-56, delete "store-though" and substitute therefor --store-through--.

Signed and Sealed this

Twenty-third Day of August, 1994

Attest:

BRUCE LEHMAN

Attesting Officer      Commissioner of Patents and Trademarks